Dec. 23, 1941. M. H. McCOY Re. 21,985
BARBER'S COMB
Original Filed June 15, 1940
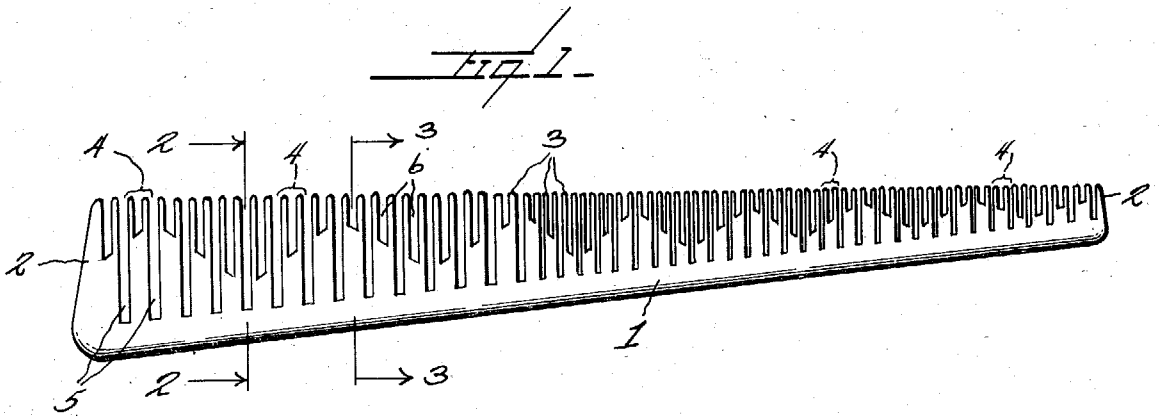
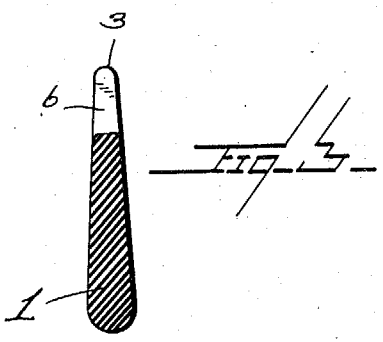
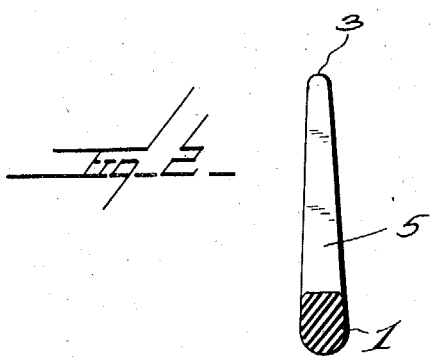
Inventor
M. H. McCoy
By Watson E. Coleman
Attorney Reissued Dec. 23, 1941 Re. 21,985

UNITED STATES PATENT OFFICE 21,985

BARBER'S COMB

Milo Hazen McCoy, Longmont, Colo.

Original No. 2,246,746, dated June 24, 1941, Serial No. 340,786, June 15, 1940. Application for reissue October 2, 1941, Serial No. 413,355

5 Claims. (Cl. 132—11)

This invention relates to improvements in combs and pertains particularly to an improved barber's comb.

In the process of cutting or trimming the hair, the hairdresser must repeatedly go over the hair, in using the ordinary type of hairdresser's or barber's comb, in order that when the hair cutting operation is completed, the hair will not show lines or ridges or have a stepped appearance. Due to this necessity for going over the hair several times in order to avoid the formation of a ridged or stepped appearance, considerable time is consumed which can be avoided by the use of the comb embodying the present invention.

The present invention has for its primary object to provide a new and novel type of hairdresser's or barber's comb, which is so designed that when the hair is picked up by the comb and held while being cut with the shears, it will hold the hair in such manner that the ends after being cut, will be uneven and thus when the hair is allowed to drop back against the head, the unevenness of the cut ends will prevent the hair from having a ridged or stepped appearance.

Another object of the invention is to provide a hairdresser's comb in which teeth are in groups (two or more teeth to a group) and the spaces between the individual teeth of a group are filled out to varying extents so that the comb will present in side elevation a wavy appearance, the spaces between adjacent groups of teeth extending to the full depth of the tooth or from the points of the teeth to the back of the comb in the customary manner, by which arrangement of fillings between the teeth of the spaced groups, the hair, when lifted by the comb, will be held in such manner that when it is cut by the shears, the cut ends will be uneven instead of being in line as might be the case if lifted by a comb of ordinary or usual design.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing Figure 1 shows a comb in side elevation constructed in accordance with the present invention; Figure 2 is a sectional view on the line 2—2 of Figure 1; and Figure 3 is a sectional view on the line 3—3 of Figure 1.

Referring now more particularly to the drawing, the comb embodying the present invention has, as shown, the usual solid back 1 and the relatively heavy end teeth 2. The teeth 3 which lie between the terminal or end teeth, are divided in groups preferably containing two teeth, as shown, although a greater number may be employed if desired, each group being indicated by the numeral 4. Between adjacent groups or pairs of teeth, the spaces 5 extend the usual or full depth or, in other words, extend from the points of the teeth to the back 1, as shown in Figure 1. Between the groups or pairs of teeth the spaces 6 are of varying depth. By this is meant that the spaces 6 increase in depth toward the back of the comb through a number of adjacent pairs of teeth, then decrease in depth through a like number of pairs of teeth, and this increase and decrease in the depth of the spaces 6 continues through the length of the comb, thus giving to the comb when viewed in side elevation, a wavy line forming the contact line for the hair which engages between the comb teeth. This wavy hair contact line is, of course, broken at regular intervals by the deep spaces 5.

From the foregoing it will be readily apparent that when the comb is in use, the hair engaging between the teeth, when picked up, will lie against the wavy contact line formed by the varying depths of the spaces 6 between the pairs of the teeth and will thus be held unevenly while being cut by the shears or clippers. The result of this will be that when the hair is dropped after being cut, the ends will be of uneven or of different lengths and, therefore, there will not be formed a ridge such as frequently results from the cutting of hair by the use of an ordinary type of comb by an inexpert hair cutter. Naturally, some of the hair falling into the deep spaces 5 between the groups of teeth will be further out of line and will be cut at a different length so as to further avoid the formation of the undesirable straight line or ridge.

Having fully described my invention, what I claim as new and desire to secure by Letters Patent of the United States is:

1. In a comb having a back, a plurality of teeth arranged in groups of two, the spaces between the groups of teeth all extending from the points of the teeth to the back and the spaces between the teeth of the pairs being of varying lengths and arranged to present a base line for the teeth of wavy contour, which base line is broken by the said spaces between the groups of teeth.

2. A comb of the character stated, having teeth arranged in pairs, each pair of teeth being separated from an adjacent pair by a relatively deep space, the space between the teeth of each pair being of less depth than the first mentioned spaces and the comb body at the bottom of the space between the teeth of each pair sloping in the direction of the length of the comb, the spaces between the teeth forming the pairs being of varying depths and arranged whereby the sloping bottom portions thereof will be disposed along intersecting lines extending oblique to the length of the comb to give the comb when viewed in side elevation, a base line for the teeth of wavy contour broken by the first mentioned spaces.

3. A comb of the character described having a back portion and teeth, said comb being so formed that the depths of the spaces between some teeth are different than the depths of the spaces between other teeth and said teeth and spaces being so arranged that the depths of the spaces will progressively increase and decrease longitudinally of the comb to thus present a line formed by the bottom of the spaces which has a wavy contour and the spaces between certain other teeth which are positioned between the ends of each wave having such a depth as to extend below the wave line.

4. A comb of the character described having a back portion and teeth, said teeth being formed in groups with each group having a plurality of teeth, the spaces between the groups of teeth extending to a point adjacent the back of the comb and the other spaces between the teeth of the groups being of variable depth and so arranged that the bottoms of said spaces lie on a longitudinally extending line having a wavy contour when viewed from the side of the comb, each of said waves including more than one group of teeth.

5. A comb of the character described having a back portion and teeth arranged in groups with the spaces between the teeth forming each groups so varying in depth that the bottoms of the spaces will lie on a line having a wavy contour when viewed from the side of the comb, each wave length being such as to include at least two groups and the spaces between adjacent end teeth of adjacent groups being such as to extend toward the back of the comb a greater distance than the next space on either side as formed by teeth of a group.

MILO HAZEN McCOY.